(12) United States Patent
Jaer (10) Patent No.: US 8,072,087 B2
(45) Date of Patent: Dec. 6, 2011

(54) WAVE POWER CONVERTER

(75) Inventor: Øystein Jaer, Oslo (NO)

(73) Assignee: Naval Dynamics AS, Oslo (NO)

(*) Notice: Subject to any disclaimer, the term of this patent is extended or adjusted under 35 U.S.C. 154(b) by 704 days.

(21) Appl. No.: 11/629,003

(22) PCT Filed: Jun. 10, 2005

(86) PCT No.: PCT/NO2005/000198
§ 371 (c)(1),
(2), (4) Date: Sep. 22, 2008

(87) PCT Pub. No.: WO2005/121549
PCT Pub. Date: Dec. 22, 2005

(65) Prior Publication Data
US 2009/0015013 A1    Jan. 15, 2009

(30) Foreign Application Priority Data
Jun. 10, 2004   (NO) .................................. 20042394

(51) Int. Cl.
*F03B 13/10* (2006.01)
(52) U.S. Cl. .......................................... 290/53; 290/42
(58) Field of Classification Search .................... 290/42, 290/43, 53, 54
See application file for complete search history.

(56) References Cited

U.S. PATENT DOCUMENTS

| | | | |
|---|---|---|---|
| 969,903 A * | 9/1910 | Rant .......................... | 417/332 |
| 1,076,844 A | 10/1913 | Shipman | |
| 3,817,662 A * | 6/1974 | Sterk .......................... | 417/333 |
| 3,918,261 A | 11/1975 | Bailey | |
| 4,111,610 A * | 9/1978 | Brown .......................... | 417/332 |
| 4,364,715 A * | 12/1982 | Bolding ........................ | 417/100 |
| 4,560,884 A * | 12/1985 | Whittecar ...................... | 290/42 |
| 7,432,612 B2 * | 10/2008 | Lomerson et al. ............... | 290/53 |
| 7,536,859 B2 * | 5/2009 | Tai et al. ..................... | 60/497 |
| 7,549,288 B1 * | 6/2009 | Layher ......................... | 60/497 |
| 7,759,814 B2 * | 7/2010 | Oigarden ....................... | 290/53 |
| 7,786,609 B2 * | 8/2010 | Houser et al. .................. | 290/53 |
| 7,918,625 B2 * | 4/2011 | Kelly et al. ................... | 405/76 |

FOREIGN PATENT DOCUMENTS

| | | |
|---|---|---|
| GB | 2 082 687 A | 3/1982 |
| WO | WO 03/087569 A1 | 10/2003 |

* cited by examiner

*Primary Examiner* — Nicholas Ponomarenko
(74) *Attorney, Agent, or Firm* — Frommer Lawrence & Haug LLP; Ronald R Santucci (57) ABSTRACT

A wave power converter for implementation at an offshore location where it will be exposed to passing waves and swell, comprises a buoyancy element (1) placed within a reaction structure (3) so as to move at least vertically relative to the reaction structure (3), with a force transfer mechanism (2) that connects the buoyancy element (1) to the reaction structure (3) and transfers at least vertical relative motions between the buoyancy element (1) and the reaction structure (3) to a linear energy converting arrangement (8) in the reaction structure (3). Said mechanism (2) is articulated and configured to transfer compression, tension and shear reactions, but essentially no movements, between the buoyancy element (1) and the reaction structure (3) and at the same time allow limited rotational movements between the buoyancy element (1) and the reaction structure (3) about at least two orthogonal axes (X, Y).

17 Claims, 9 Drawing Sheets

Figure 17

WAVE POWER CONVERTER

This application is a 371 of PCT/NO2005/000198 filed on Jun. 10, 2005, published on Dec. 22, 2005 under publication number WO 2005/121549 A1 which claims priority benefits from Norwegian Patent Application Number 2004 2394 filed Jun. 10, 2004.

FIELD OF THE INVENTION

The invention concerns a mobile floating moored wave power converter that converts ocean waves and swell into a useful work, primarily electricity. The basic layout consists of a buoyancy element placed within a rigid reaction structure. The buoyancy element can move within the superstructure through a special mechanism, and this relative motion between the buoyancy element and the reaction structure is converted into linear vertical motions in the reaction structure.

BACKGROUND OF THE INVENTION

Ocean waves originate as a consequence of wind far off shore, and these waves travel enormous distances without losing much energy, even long after the winds that created them have died down. This results in wave energy being more stable and predictable than wind power. In addition, wave power has about 1000 times greater kinetic energy than wind energy as a result of water being 850 times denser than air.

The highest energy waves are concentrated off the western coasts of the continents in the 40°-60° latitude range of the northern and southern hemispheres. The power in the wave fronts varies in these areas between 30 and 70 kW/m with peaks to 100 kW/m in the Atlantic SW of Ireland, the Pacific Ocean and off Cape Horn. The capability to supply electricity from this resource is such that, if harnessed appropriately, significant parts of the present world demand could be provided.

Historically speaking, the majority of wave power converter developers have focused on singular characteristics of waves to convert energy. Some previous patent publications that involve wave power converters are discussed below:

U.S. Pat. No. 1,076,844 shows a wave power generator with a U-shaped frame with wheels that moves vertically in waves. Within this frame lies a buoyancy element that is connected to the frame through a linkage. On the top of the buoyancy element it is connected through a rotating shaft journalled in the superstructure so that, in addition to a vertical motion, it can also move horizontally. Power is taken out through the rotating shaft.

U.S. Pat. No. 3,918,261 shows an operating lever having a float secured to one end pivoted intermediate the ends thereof. An elongated channel shaped member having a rack secured thereto is guided for vertical movement along its length and is connected to the other end of the operating lever by a lost-motion connection. A pinion is mounted in meshing engagement with the rack and can be operatively connected to suitable power generating means.

WO 03/087569 A1 shows a tidal based power plant that is intended to perform seawater desalinization. A buoy moves vertically with the tidal motion of the sea and surrounds at least two pillars that are secured to the sea floor. The buoy pressurizes sea water through conventional cylinder/piston arrangements.

SUMMARY OF THE INVENTION

The purpose of the invention is to obtain a wave power converter that will convert more of the wave energy and at the same time reduce the strains and stresses to which it is subjected so as to prolong its useful life. According to the invention, this is obtained by the features set forth in claim 1.

This invention exploits all the resulting 3-dimensional motions, namely heave, pitch and roll. The resulting surge, sway and yaw responses can also be utilized. In addition, the varying differential water pressure as a result of the passing wave will further optimize the phase reactions. This means that when the central buoyancy element moves up in the vertical plane (combination of heave, pitch and roll), the support/reaction structure will move downwards (combination of negative heave, pitch and roll) due to the varying hydrodynamic forces—therefore increasing the relevant motions significantly. The mooring system is configured to further optimize the relevant motions and the generator damping will also induce a tuning variable of the system with respect to phase control. This is expected to result in a better energy output and render the invention with an efficiency that exceeds that of other prior art wave power systems.

BRIEF DESCRIPTION OF THE DRAWINGS

The preferred and alternative embodiments of the present invention are described in detail below with reference to the following figures.

DETAILED DESCRIPTION OF THE INVENTION

Figure 1:
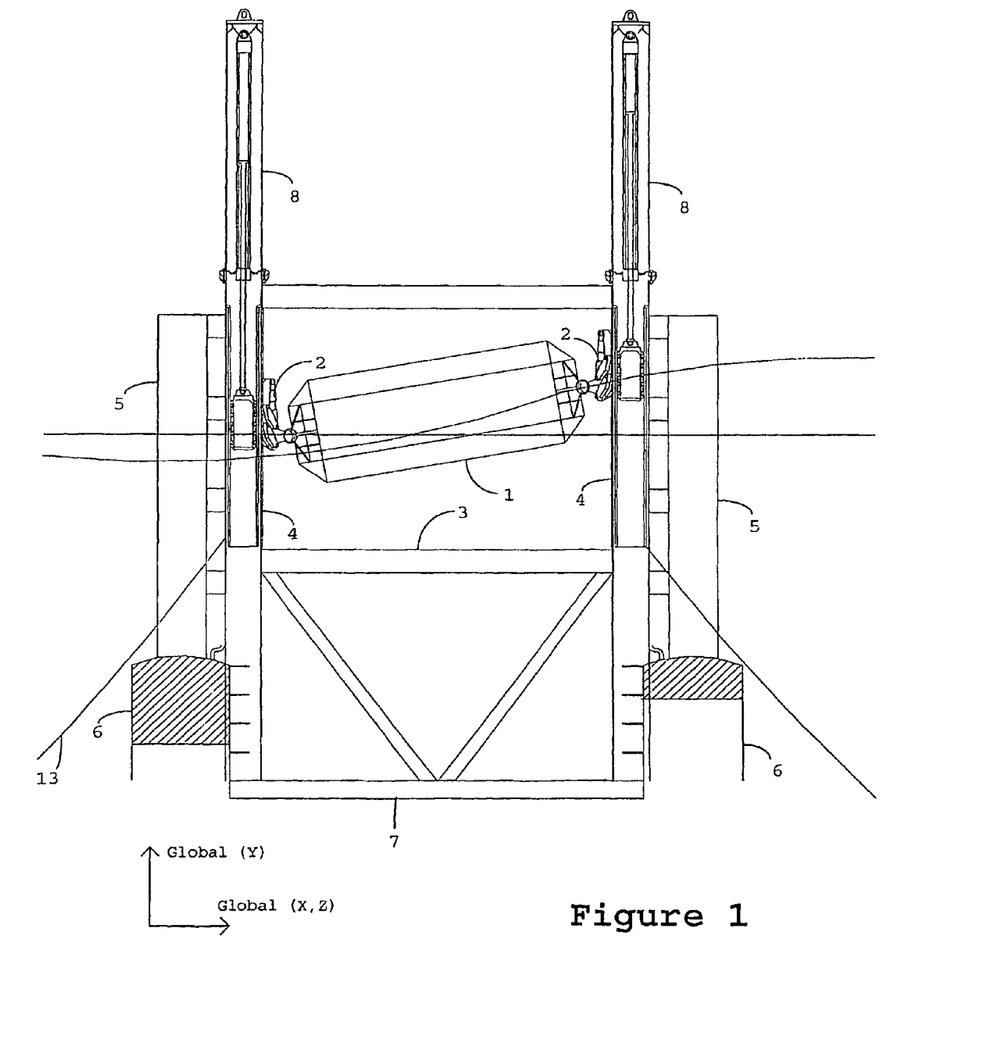
FIG. 1 shows a side view, partly in section, of the preferred general arrangement of a wave power converter according to the invention.
Figure 2:
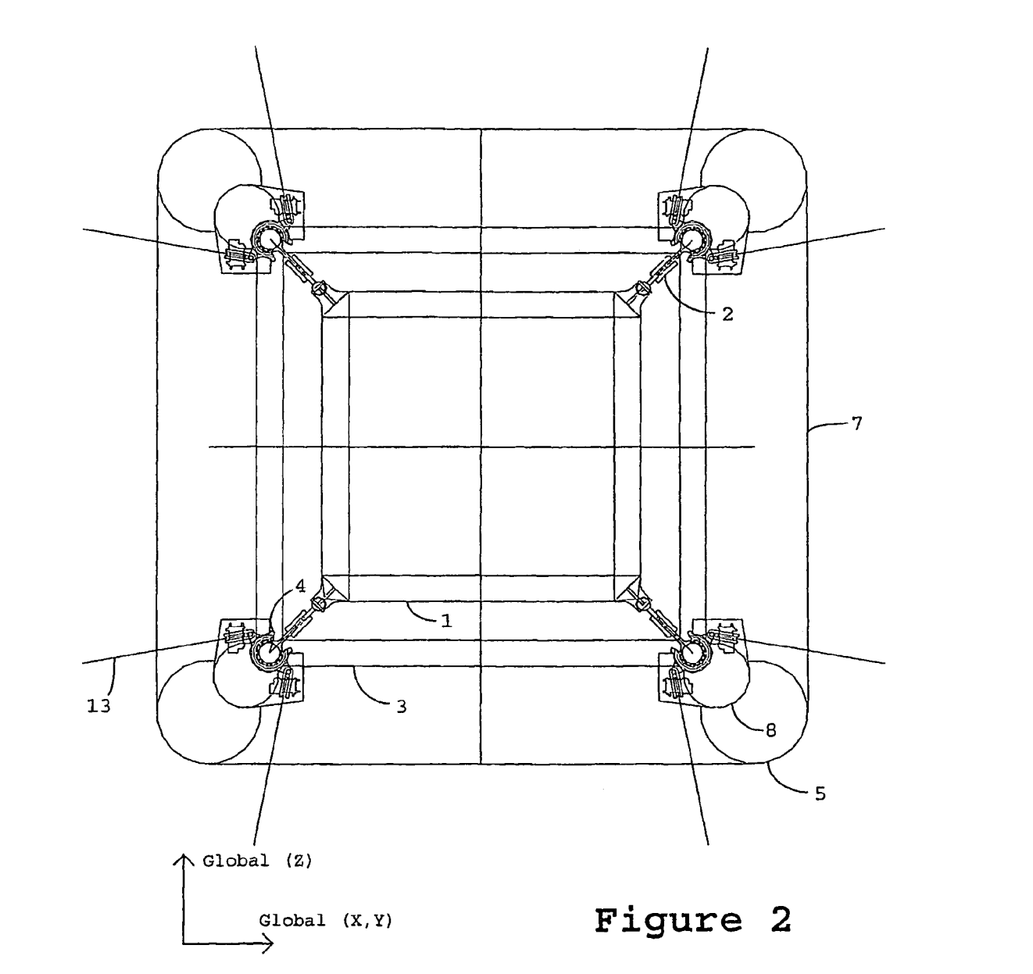
FIG. 2 is a plan view or plan view of the converter shown in FIG. 1.

FIG. 1 and FIG. 2 shows the arrangement of the 2-part floating wave converter device which comprises of a centrally positioned buoyancy element 1 which is ballasted to approximately 50% of its total displacement and connected by a series of articulated force transfer mechanisms 2 to a surrounding moored floating reaction structure 3. This floating moored, (13 mooring lines), reaction structure 3 comprises of vertical guide tracks 4, buoyancy tanks 5, soft tanks 6 and a reaction plate 7. The reaction structure 3 is configured to react in opposing phase to the central buoyancy element 1. The power converter systems 8 are mounted in this structure. The damper mechanisms 2 are configured to react freely in all six degrees of freedom while transferring the resultant vertical reaction to a long stroke power converter 8 mounted in the reaction structure 3. This power converter 8 is preferred to be a hydraulic system but can readily be of an electric type, pneumatic or other mechanical device.

This force reaction between the buoyancy element 1 and floating reaction structure 3 is moment-less and comprises of resultant shear, compression and tension loads.

Figure 3:
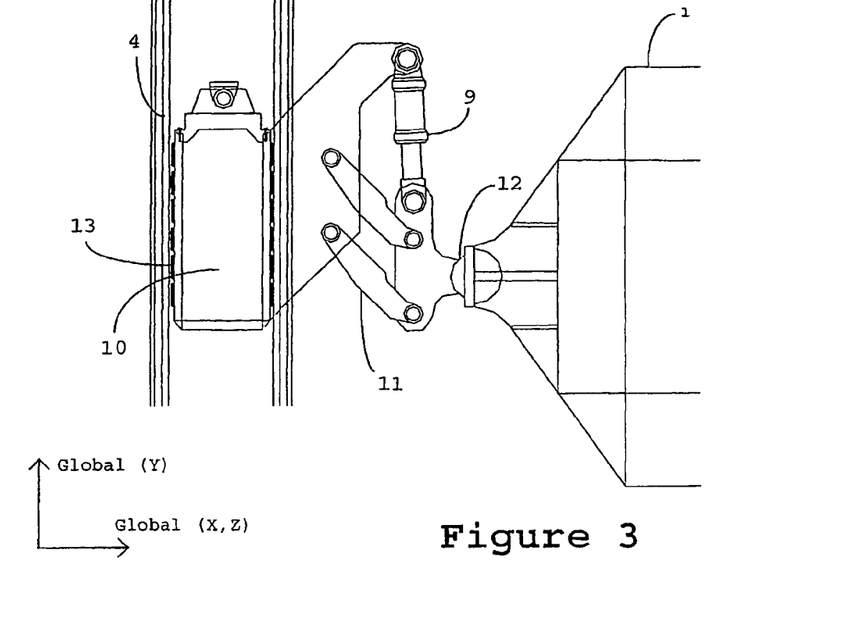
FIG. 3 shows side view of a detail of the converter in FIG. 1.
Figure 4:
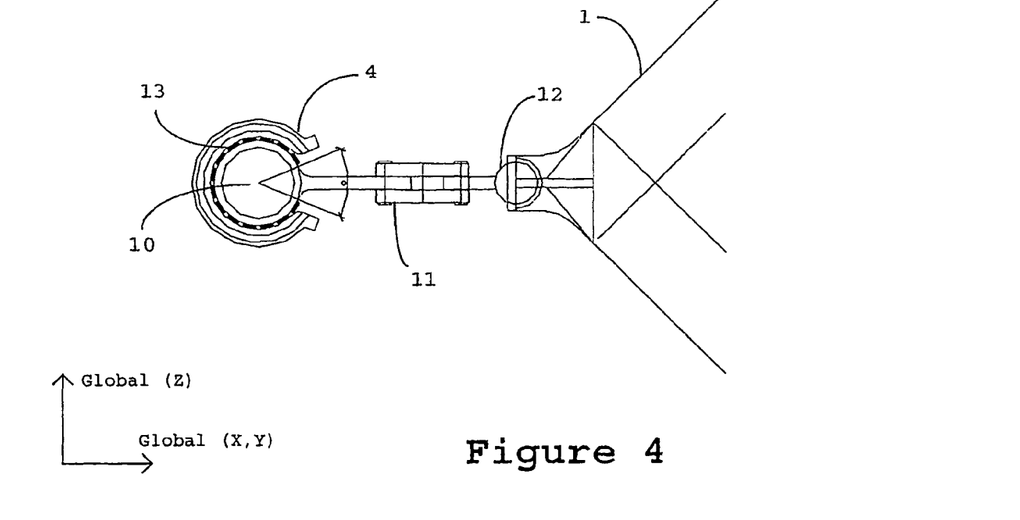
FIG. 4 shows a plan view of the detail of FIG. 3.
Figure 5:
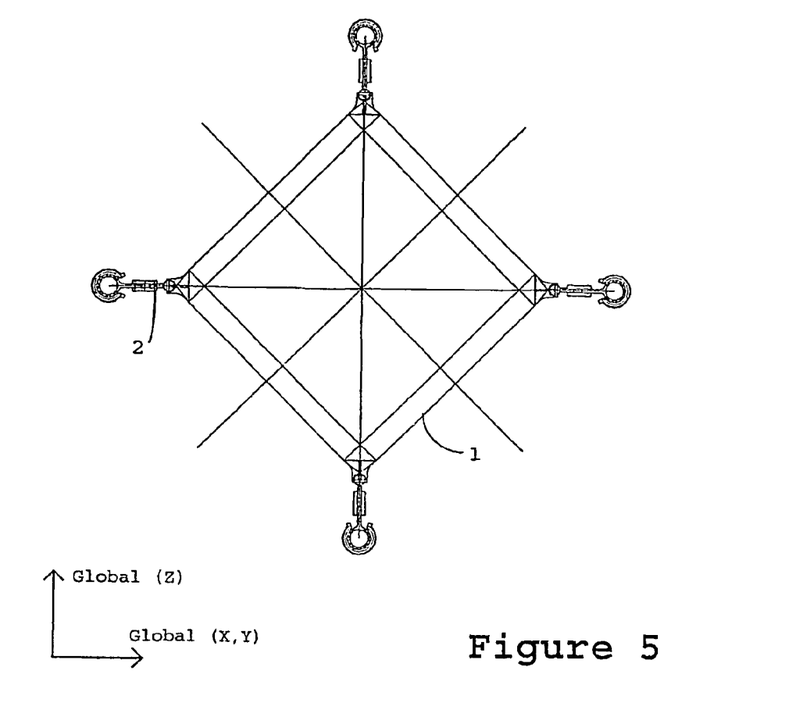
FIG. 5 shows a plan view of a buoyancy element and articulated force transfer mechanisms of the converter of FIG. 1 in the neutral position.
Figure 6:
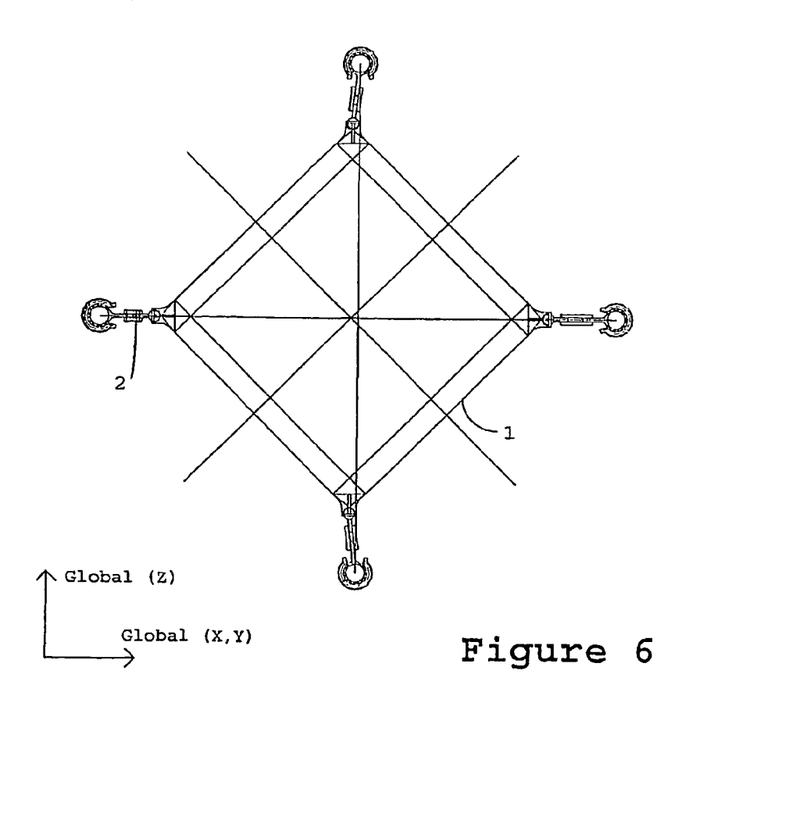
FIG. 6 shows a buoyancy element and articulated force transfer mechanisms in the maximum horizontal position (surge motions position).
Figure 7:
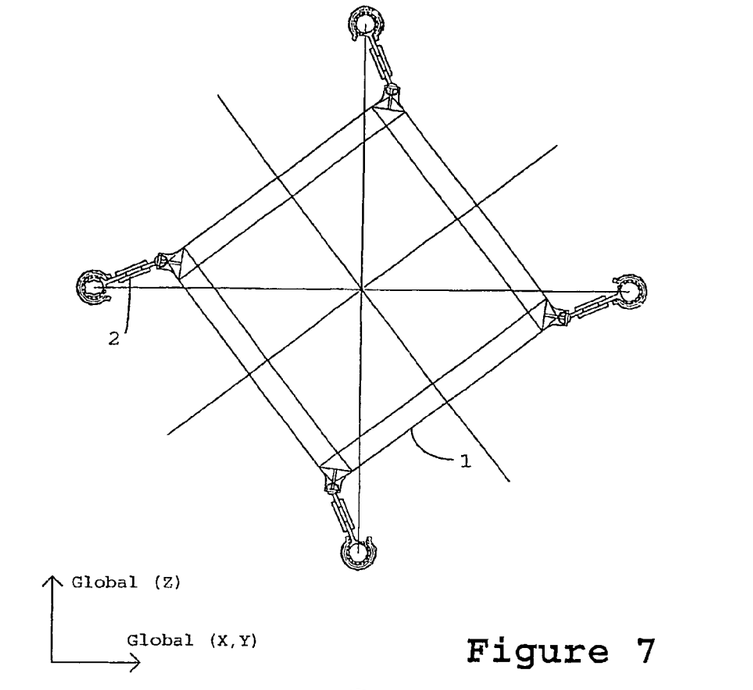
FIG. 7 shows a plan view of the buoyancy element and articulated force transfer mechanisms of FIG. 5 in the maximum horizontal position (surge and sway motions).
Figure 8:
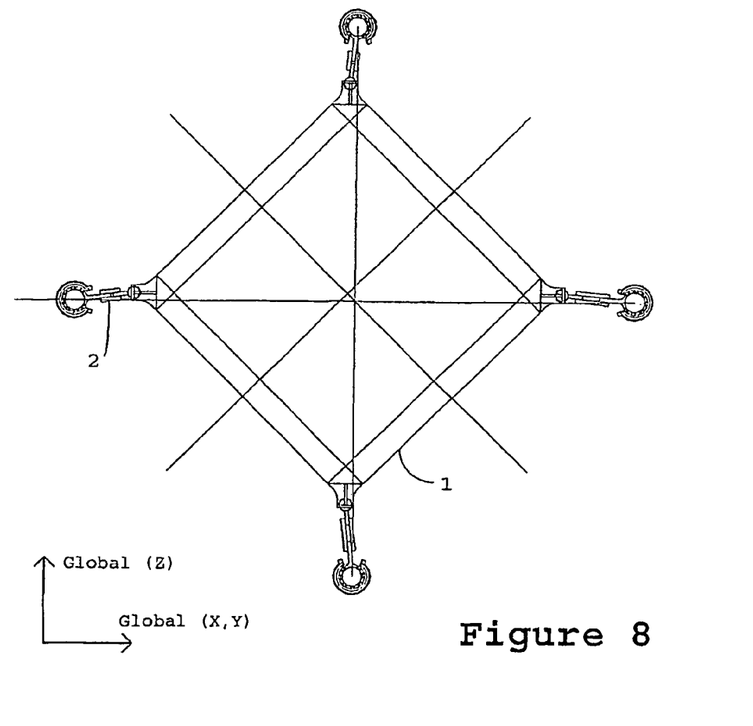
FIG. 8 shows a plan view of the buoyancy element and articulated force transfer mechanisms in the maximum horizontal rotation (yaw).
Figure 9:
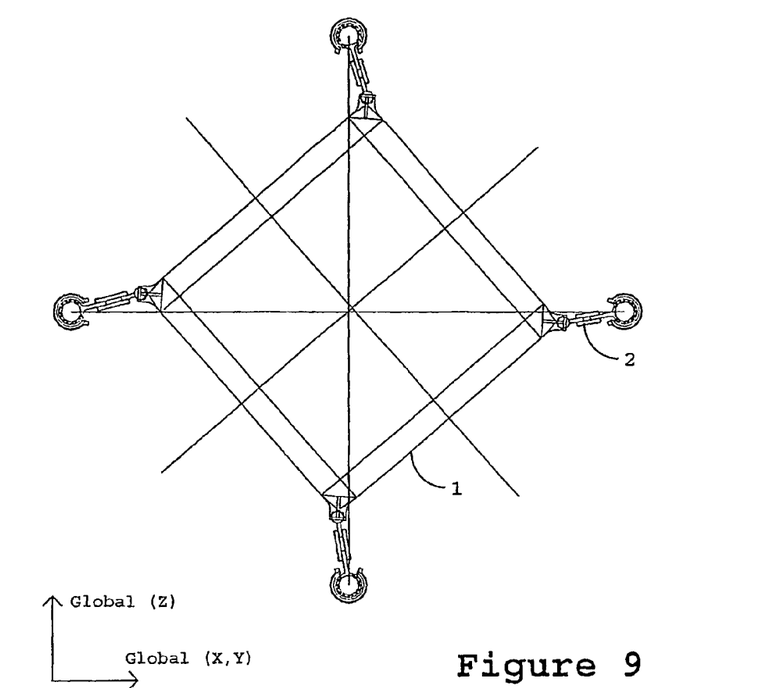
FIG. 9 shows a plan view of the buoyancy element and articulated force transfer mechanisms in a combination of motions (pitch, roll, surge, sway and yaw motions)
Figure 10:
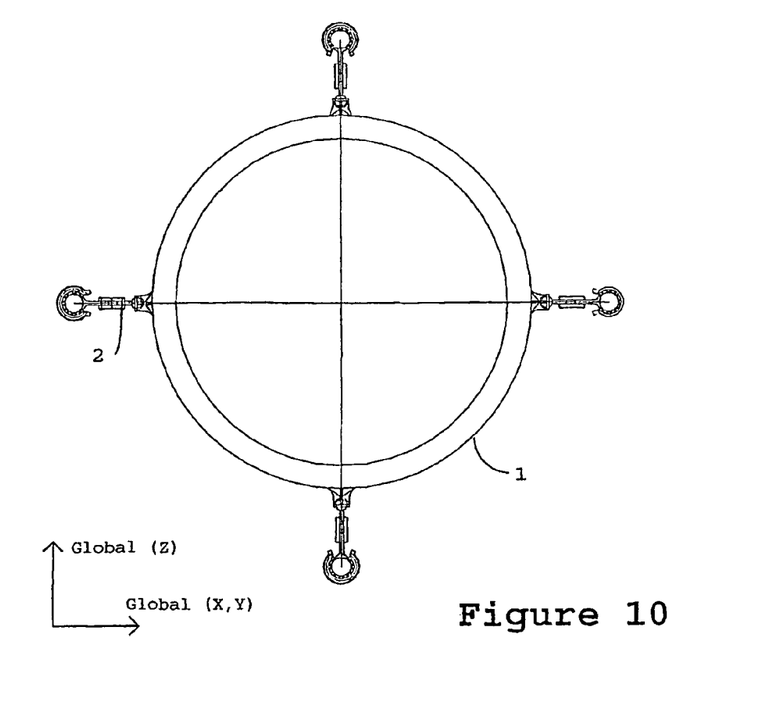
FIG. 10 shows a plan view of a circular buoyancy element and articulated force transfer mechanisms in neutral position.

FIG. 3 and FIG. 4 illustrates the articulated damper mechanism 2. These have a short stroke hydraulic cylinder 9 which damps out the relative lateral displacement between the buoyancy element 1 and floating reaction structure 3 as a function of pitch, roll, yaw, surge and sway while transferring the main vertical reactions (heave and pitch/roll) against the moored floating reaction structure. The mechanism comprises of a vertically sliding piston 10 which is free to move vertically within the guide track 4 on the floating reaction structure. The sliding piston 10 is also free to rotate in the lateral plane through a set angle, proximately +/−15 degrees to allow a damped yaw reaction (lateral rotation). The sliding piston 10 is fitted with bearing units 13 which ensure low friction and lubrication against the vertical guide tracks 4.

The articulated mechanism 2 will not come into contact with the vertical guide track 4 edges due to the limiting three-dimensional articulation of the parallelogram arms 11 and hydraulic cylinder 9. The buoyancy element 1 is free to pitch and roll through an angle of proximately +/−15 degrees. The lateral geometry will then vary as the roll angle is increased and the articulated mechanism allows and damps out this motion by the parallelogram arms 11 rotating inwards and outwards while transferring the resultant vertical force through to the sliding piston 10 and onwards to the power converters 8. The same principle applies when the buoyancy element 1 moves and rotates in the lateral plane and the resultant motions are decomposed into useful work through a multidimensional reaction. The buoyancy element 1 is connected to the articulated mechanism 4 through a moment-less connection of a ball and socket joint 12. This joint 12 transfers all buoyancy element 1 reactions moment-less to the sliding piston 10 and further on to the power converters 8.

In FIG. 5 through FIG. 10 a series of plan views indicating the different maximum lateral motions are illustrated. The articulated force transfer mechanisms 2 allow a certain range of motion between the buoyancy element 1 and the floating reaction structure 3 limited by the range of the parallelogram arm rotation. This allows and damps out the resulting three-dimensional reactions while transferring the resulting vertical reaction to the power converter systems.

Figure 11:
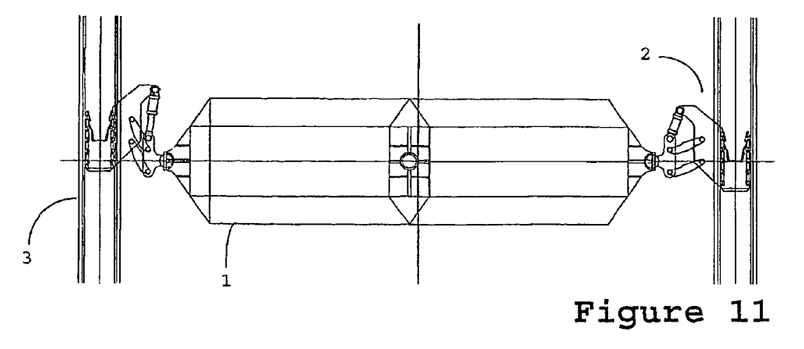
FIG. 11 shows a side view of the buoyancy element and the articulated force transfer mechanisms arrangement in maximum horizontal position (surge, sway and yaw motions)
Figure 12:
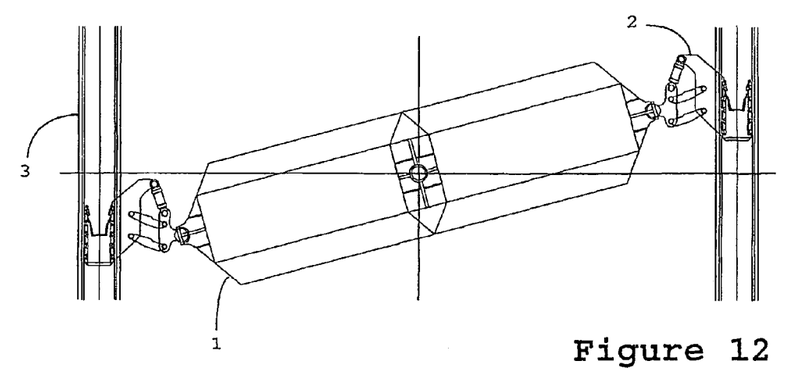
FIG. 12 shows a side view of the buoyancy element and the articulated force transfer mechanism arrangement in maximum rotation (pitch and roll motions)
Figure 13:
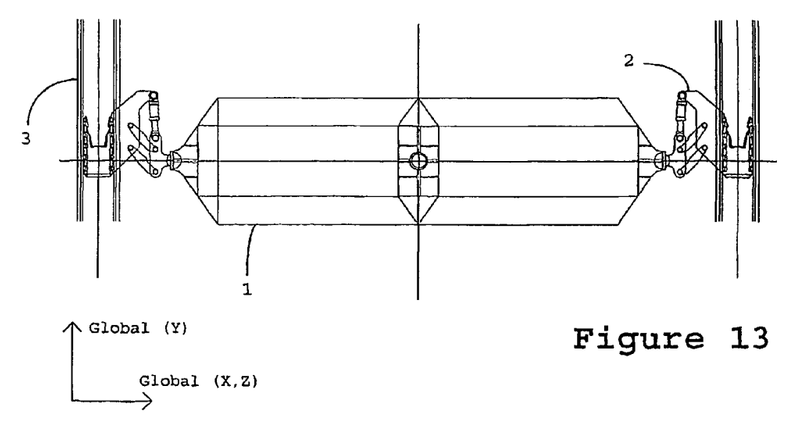
FIG. 13 shows a side view of the buoyancy element and the articulated force transfer mechanisms arrangement in neutral position.

FIG. 11 through 13 indicate the same motions seen in a profile view. Here the pitch and roll motions are indicated. The resulting lateral motion between the buoyancy element 1 and reaction structure 3 is allowed and dampened out by the hinged parallelogram arms 11 moving either in or out, tensioning or compressing the damper cylinder 9, respectively. The heaving motions and resultant roll and pitching motions are transferred to the power converters mounted in the floating reaction structure 3.

The hydraulic systems comprise a series of piping and flexible pressure hoses to a deck mounted valve system, which charges a hydraulic accumulator system that again powers a hydraulic motor that turns a conventional generator. The same deck location houses any alternate power converting systems.

The invention exploits all the resulting three-dimensional motions, namely heave, pitch and roll. The resulting surge, sway and yaw responses can also be utilized in the power conversion process primarily through the short stroke cylinders 9 and parallelogram arms 11. In addition, as a result of the passing wave system, the varying differential water pressure will further optimize the phase reactions. This means that when the central buoyancy element moves up in the vertical plane (combination of heave, pitch and roll due to wave surface elevation/buoyancy), the support/reaction structure will move downwards (combination of negative heave, pitch and roll) due to the varying hydrodynamic forces—therefore increasing the relevant motions significantly.

This is achieved by tuning the buoyancy elements 5, soft tanks 6 and reaction plate 7 geometry (FIGS. 1 & 2) so that a passing wave system will induce a opposing reaction. This is due to varying particle pressure on the reaction plate 7 and differential displacement in the soft tanks 6 due to varying water pressure at depth at the lower soft tank open edge. The buoyancy tanks 5 provide adequate water plane area to ensure sufficient stability, while the soft tanks 6 have a displacement proportional to the displacement of the central buoyancy element 1. The soft tanks ideally have a pressure regulator valve which allows the initial calm water air pocket pressure to be set at an optimum value, dependent on the reaction structure draft. This air pocket pressure is a variable which may be optimized for a given sea state. The reaction structure can also be designed with a plate structure 7 fitted in the lower structure. This plate will be influenced by the varying wave particle pressure and further complement the opposing phase motions between the central buoyancy element 1 and floating reaction structure 3.

The central buoyancy elements 1 are ballasted by either a solid material or a fluid. In the latter case, the resulting free surface effect of the sloshing fluid ballast can be either countered by slosh bulkheads within the buoyancy element 1 or tuned to increase rolling and lateral motions.

The mooring system 13 is configured to further control the relevant motions, and the generator damping will also induce a tuning variable of the system with respect to phase control. This may result in a higher energy output and render the invention with an efficiency potential that far exceeds that of other wave power converter systems known to us.

Figure 14:
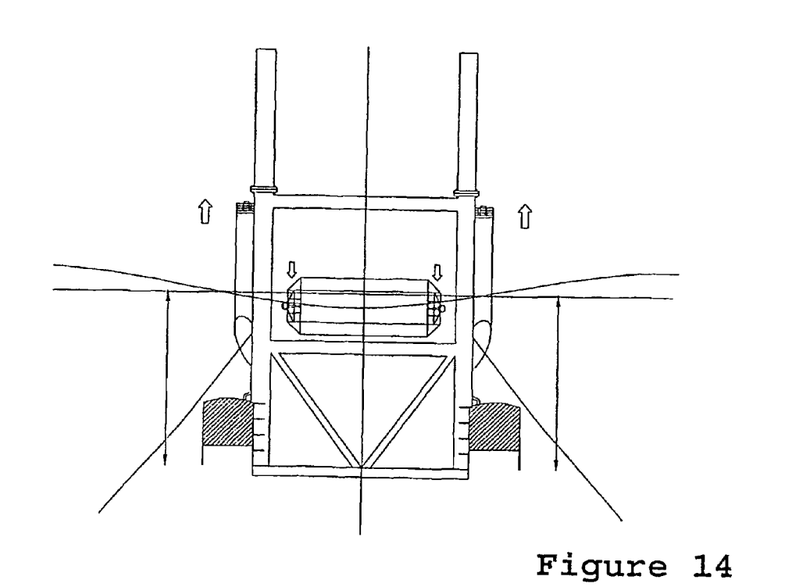
FIG. 14 through FIG. 17 shows a series of profile views of the invention for a passing wave and the corresponding relative motions of the central buoyancy element and the floating reaction structure.

In FIG. 14 a view indicate the typical motions. The view illustrates the system in the trough (bottom) of a wave. The central buoyancy element 1 is in a low vertical position relative to the floating reaction structure 3 which is experiencing increased buoyancy due to the decreasing water pressure which increases the volume of the air pocket in the soft tanks 6 hence resulting in a upward motion relative to the central buoyancy element 1. The mooring system 13 is tightened.

Figure 15:
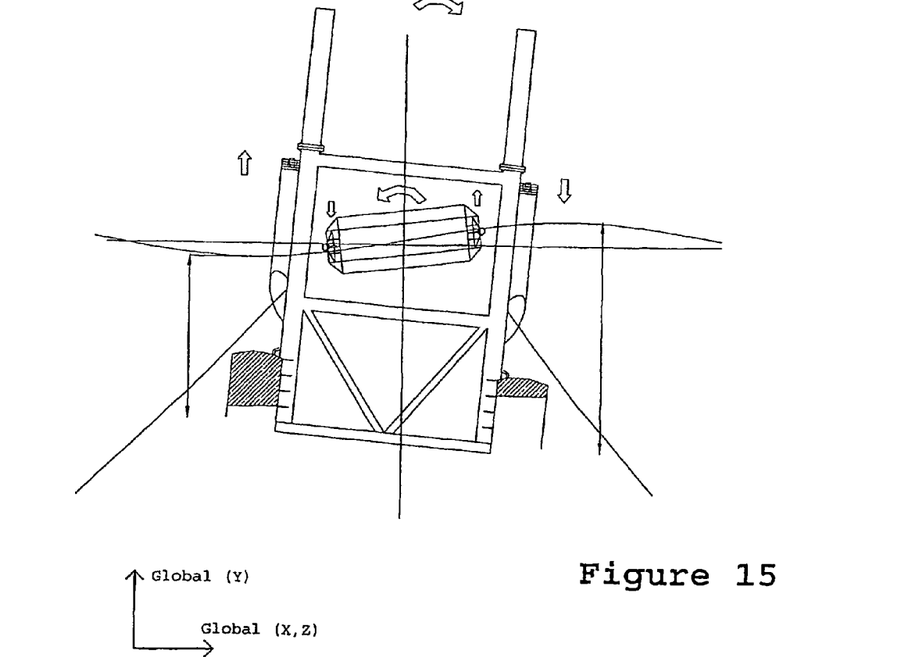

In FIG. 15 the view illustrates a wave encounter where the wave surface elevation causes the central buoyancy element 1 to pitch and heave upwards, while the resulting differential wave and water pressure (depth dependant) forces the floating reaction structure 3 to pitch in the other direction and heave downwards due to the increased water pressure imposed on the soft tanks 6 which reduces buoyancy and also imposes a differential buoyancy in the soft tanks on either side of the floating reaction structure 3, which in turn induces a opposing pitching motion relative to the central buoyancy element 1.

The varying water particle pressure will also induce a pitching motion through the reaction plate 7 mounted on the floating reaction structure. The mooring system 13 is asymmetrically tightened.

Figure 16:
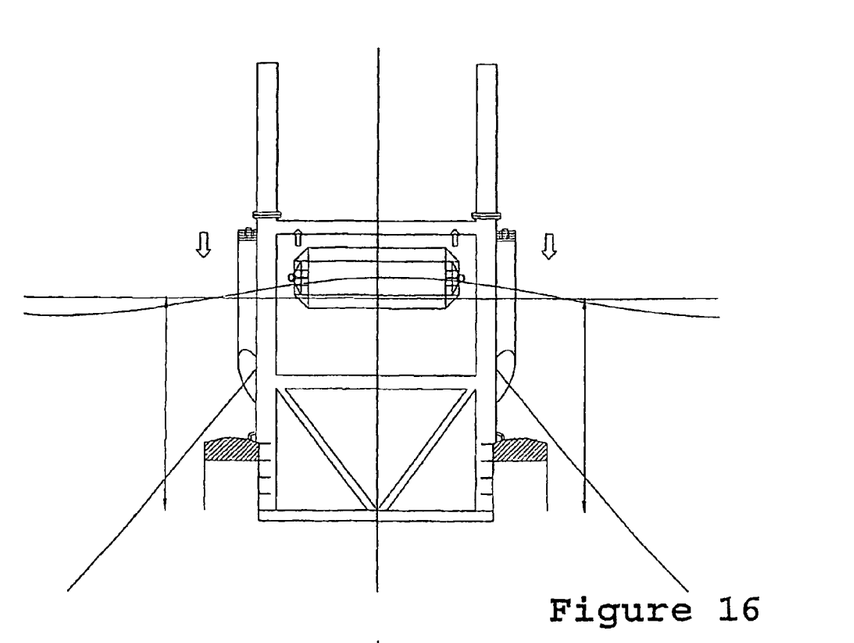

FIG. 16 indicates a wave top where the buoyancy element 5 is in its top position in a horizontal position about to pitch over the wave top. The increased water pressure at depth on the soft tanks 6 causes the air pocket to diminish and hence loss of buoyancy with negative heave motion of the floating reaction structure 3 relative to the central buoyancy element 1. This results in a greater relative motion and velocity between the 2 parts and hence larger force reaction in the power converters.

The linear power converters 8 can either be set to a predetermined optimum fixed damping (kg/sec) level or be a real time variable as a function of current sea state.

Figure 17:
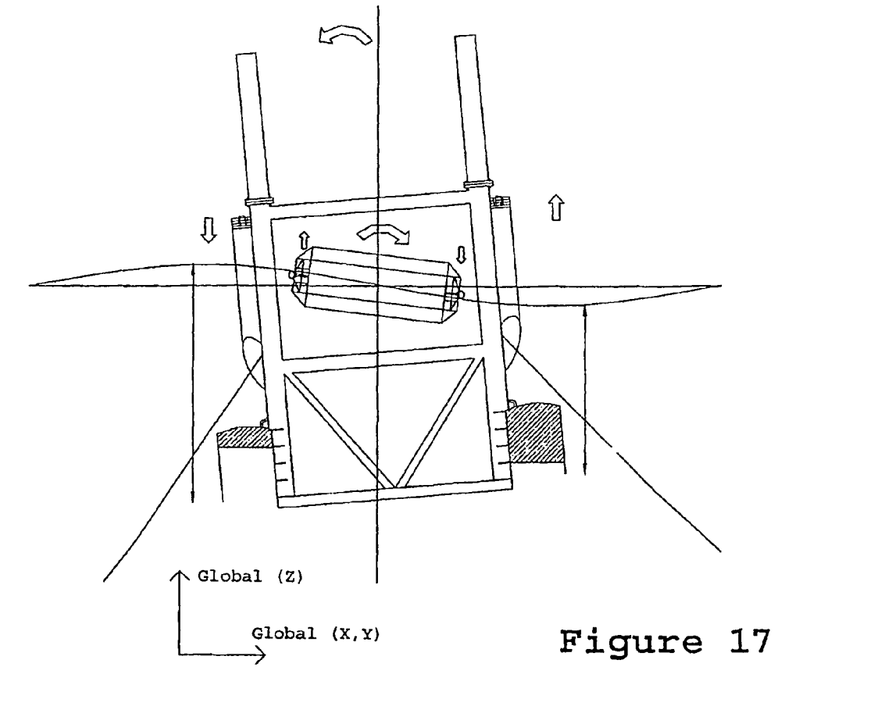

FIG. 17 view is the wave top passed where the opposite of the encounter scenario occurs.

The system is configured to accommodate storm conditions and freak waves. The system allows a rotation of +/−15 degrees as well as a stroke length of 14 meters. In addition, a hydraulic valve will secure the system and lock the two floating bodies together, and they will react as a conventional floating moored structure in a survival/non-generating mode. In terms of service/part replacement and inspection the same system is used. For intricate repairs the floating system can release its mooring lines and be towed to a shore facility for repairs.

Although the invention is expected to be most useful in the case of the buoyancy element being arranged in a self-floating reaction structure, it will be understood that the invention will be useful when the reaction structure is mounted on separate support structure, e.g. any floating or fixed static foundation such as mobile jack-up type rigs, semi-submersibles, tension legs, platforms (TLP), decommissioned or newbuilt bottom supported structures, including gravity base structures. Also, the buoyancy element need not be quadrangular in plan view, but may have any suitable form.

Furthermore, it will be understood that the invention is not limited to the exemplifying embodiment disclosed herein, but may be varied and modified by the skilled person within the scope of the invention as defined by the following claims.

I claim:

1. A wave power converter for implementation at an offshore location where it will be exposed to passing waves and swell, comprising a buoyancy element placed within a reaction structure so as to move at least vertically relative to the reaction structure, with a force transfer mechanism that connects the buoyancy element to the reaction structure and transfers at least vertical relative motions between the buoyancy element and the reaction structure to a linear energy converting arrangement in the reaction structure,
   wherein said mechanism is articulated and configured to transfer compression, tension and shear reactions, but essentially no moments, between the buoyancy element and the reaction structure and at the same time allows limited rotational movements between the buoyancy element and the reaction structure about at least two orthogonal axes.

2. A wave power converter of claim 1,
   wherein the said mechanism allows rotation about a third orthogonal axis as well.

3. A wave power converter of claim 1,
   wherein the reaction structure is a floating structure that is moored through a mooring system that allows both vertical movements as well as limited rotational movements of the floating reaction structure.

4. A wave power converter of claim 3,
   wherein the floating reaction structure incorporates hydrostatically and/or hydrodynamically influenceable elements that are so configured and positioned that when a wave with a wave length within a predetermined range passes the floating reaction structure and the buoyancy element, the corresponding wave induced motions of the floating reaction structure and the buoyancy element will be mainly opposite.

5. A wave power converter of claim 1,
   wherein the reaction structure is fixed to a suitable fixed substructure instead of being moored.

6. A wave power converter comprising a buoyancy element arranged to interface with a wave surface profile, a surrounding floating moored reaction structure, articulated force transfer mechanisms which allow the buoyancy element and floating reaction structure to react against each other and generate useful work through a linear power conversion process, wherein the wave converter device buoyancy element is free to move in a vertical direction (heave) while allowing a limited pitch and roll motion, move laterally over a limited distance and rotate in the lateral plane due to the force transfer mechanisms being articulated and comprising parallelogram multiple arms to allow a limited rotation, hence lateral shift in the lateral plane between a vertical guide track and ball and socket joint on the buoyancy element allowing a six degree of freedom motion over a symbiosis limit governed by the stroke length of a damper cylinder, resultant reaction being transferred through a sliding piston which is free to rotate in the vertical guide track limited by the three dimensional action of the multiple articulated mechanisms while being free to move in the vertical direction, thus providing useful work as force reaction in linear power converters.

7. A wave power converter according to claim 6, wherein the said converter comprises a moored floating reaction structure which is configured to react against the buoyancy element due to soft tanks and buoyancy tanks being influenced by a varying hydrostatic water pressure and varying wave particle pressure, causing a maximum relative 3-dimensional reaction as a combined function of heave, pitch, roll, surge, sway and yaw.

8. A wave power converter according to claim 6, wherein the buoyancy element can be released from the linear power conversion process and submerged or raised controlled in the vertical guide tracks.

9. A wave power converter according to claim 1, wherein the reaction structure is mounted on a separate structure selected from the group comprising any floating or fixed static foundation such as mobile jack up type rigs, semi-submersibles, tension leg platforms (TLP), de-commissioned or newbuilt bottom supported structures, including gravity base structures.

10. A wave power converter according to claim 1, wherein the buoyancy element can be locked in vertical position in the vertical guide tracks, allowing maintenance and survival mode when excessive sea states are present.

11. A wave power converter according to claim 2, wherein the buoyancy element can be locked in vertical position in the vertical guide tracks, allowing maintenance and survival mode when excessive sea states are present.

12. A wave power converter according to claim 6, wherein the buoyancy element can be locked in vertical position in the vertical guide tracks, allowing maintenance and survival mode when excessive sea states are present.

13. A wave power converter according to claim 7, wherein the buoyancy element can be locked in vertical position in the vertical guide tracks, allowing maintenance and survival mode when excessive sea states are present.

14. A wave power converter according to claim 8, wherein the buoyancy element can be locked in vertical position in the vertical guide tracks, allowing maintenance and survival mode when excessive sea states are present.

15. A wave power converter of claim 2,
wherein the reaction structure is a floating structure that is moored through a mooring system that allows both vertical movements as well as limited rotational movements of the floating reaction structure.

16. A wave power converter according to claim 7, wherein the buoyancy element can be released from the linear power conversion process and submerged or raised controlled in the vertical guide tracks.

17. A wave power converter according to claim 2, wherein the reaction structure is mounted on a separate structure selected from the group comprising any floating or fixed static foundation such as mobile jack up type rigs, semi-submersibles, tension leg platforms (TLP), de-commissioned or newbuilt bottom supported structures, including gravity base structures.

* * * * *